United States Patent [19]

Lamar

[11] Patent Number: 5,375,409
[45] Date of Patent: Dec. 27, 1994

[54] PRESSURIZED FLUIDIZED BED COMBINED GAS TURBINE AND STEAM TURBINE POWER PLANT WITH STEAM INJECTION

[75] Inventor: Thomas W. Lamar, San Diego, Calif.

[73] Assignee: Ahlstrom Pyropower, Inc., San Diego, Calif.

[21] Appl. No.: 134,186

[22] Filed: Oct. 8, 1993

[51] Int. Cl.⁵ .............................. F02C 3/26; F02C 6/18
[52] U.S. Cl. .................. 60/39.05; 60/39.182; 60/39.464; 60/39.58
[58] Field of Search ............... 60/39.05, 39.12, 39.182, 60/39.464, 39.53, 39.54, 39.58; 122/4 D

[56] References Cited

U.S. PATENT DOCUMENTS

| | | | |
|---|---|---|---|
| 2,911,789 | 11/1959 | Baker | 60/39.182 |
| 3,335,365 | 8/1967 | Aguet | 60/39.182 |
| 3,693,347 | 9/1972 | Kydd et al. | 60/39.3 |
| 4,683,840 | 8/1987 | Morin | 122/4 D |
| 4,790,267 | 12/1988 | Mollenhoff et al. | 122/4 D |
| 4,893,467 | 1/1990 | Woodson | 80/39.3 |
| 5,148,668 | 9/1992 | Frutschi | 60/39.05 |
| 5,203,160 | 4/1993 | Ozono | 60/39.02 |

FOREIGN PATENT DOCUMENTS

2080883A 7/1980 United Kingdom.
PCT/GB91/-
02100 11/1991 WIPO.

Primary Examiner—Louis J. Casaregola
Attorney, Agent, or Firm—Baker, Maxham, Jester & Meador

[57] ABSTRACT

A combined cycle pressurized fluidized bed power plant having a system for maintaining operation during low load condition, comprises a pressurized fluidized combustor for burning fuel for producing a gas for powering a gas turbine, and for producing steam for powering a steam turbine, a gas turbine responsive to the gas for powering a compressor for supplying air to the combustor and a first generator for generating electrical power, a steam turbine responsive to the steam for powering a second generator for generating electrical power, and an injector for injecting steam into the gas turbine for powering the turbine and compressor during low load conditions of the power plant.

18 Claims, 1 Drawing Sheet

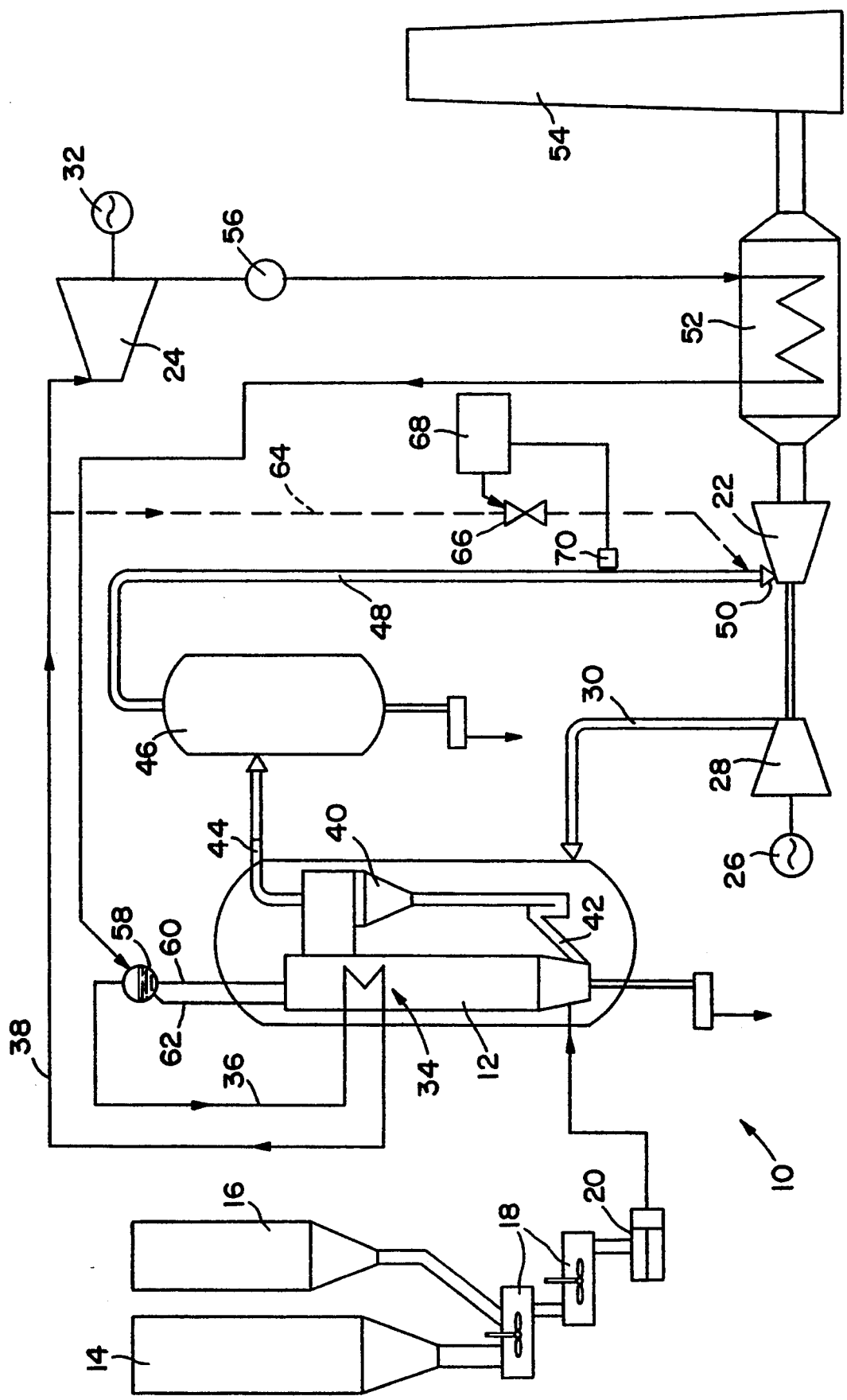

PRESSURIZED FLUIDIZED BED COMBINED GAS TURBINE AND STEAM TURBINE POWER PLANT WITH STEAM INJECTION

BACKGROUND OF THE INVENTION

The present invention relates to power plants, and pertains particularly to a pressurized fluidized bed combined gas and steam turbine power plant having a system for maintaining the operation of the compressor to keep the plant in operation at low plant loads.

Combined cycle power plants having both gas and steam turbines have recently come into use in the power generating industry to meet a need for more flexible and efficient power plants. The steam turbines are typically fueled by coal or oil through a traditional boiler. The gas turbines are typically fueled by a premium fuel, such as natural gas or a clean fuel oil through an internal combustor. These combined power plants are primarily to provide flexibility to meet changing load demands and are traditionally fueled by separate fuels.

Pressurized fluidized bed power plants have been developed to meet a need for more efficient power plants for converting fossil fuels to electrical power with minimal pollution. The circulation fluidized bed combustor features a mixture of granular limestone or other sorbent materials supported on a non-sifting grid. An upward flow of air passes through the grid lifting and fluidizing the material. This results in a turbulent mixture of the bed particles having the free flowing properties of a liquid and providing an environment for stable combustion.

Fuels introduced into the bed will burn effectively, and sulfur dioxide released by the burning is chemically captured by a calcined limestone. The mixture of solids which includes ash and calcined limestone is recirculated through the combustor until the particle size is reduced sufficiently for elutriation through the cyclones. The fluidized bed combustor also has the advantage of being able to burn a wide variety of fuels. The pressurization of the fluidized bed combustor further enhances its efficiency.

Pressurized fluidized bed systems have been developed in recent years to further improve the efficiency of the fluidized bed combustor and boiler. These systems are also able to provide the total combustion for combined cycle power plants. The combined cycle power plant normally results in a highly flexible and efficient power plant. The fluidized bed combustor provides the hot gasses to power the gas turbine and to generate the steam for the steam turbine.

The gas turbine powers the compressor that provides the pressurized air for pressurization of the system, combustion and fluidization in the combustor. When plant load is reduced, the gas flow and temperature from the PCFB combustor eventually declines to the point where that there is no longer enough power from the gas turbine to power the compressor. Operation of the compressor is essential to keeping the plant running. In order to keep the compressor operating, either auxiliary fuel must be fired in an external combustor or the generator must be motored (run like a motor) on power from the grid.

Accordingly, it is desirable that an improved power plant to overcome these problems of the prior art be available.

SUMMARY AND OBJECTS OF THE INVENTION

It is the primary object of the present invention to provide an improved pressurized fluidized bed combined cycle gas and steam power plant having a system for maintaining the operation of the compressor to keep the plant in operation at low plant loads.

In accordance with a primary aspect of the present invention, a pressurized fluidized bed combined cycle power plant includes means for powering the gas turbine by the injection of steam for maintaining the operation of the compressor to keep the plant in operation at low plant load.

BRIEF DESCRIPTION OF THE DRAWING

The above and other objects of the present invention will become apparent from the following description when read in conjunction with the drawings wherein:

The figure is a schematic illustration of an exemplary embodiment of a combined cycle system embodying the invention.

DETAILED DESCRIPTION OF THE PREFERRED EMBODIMENTS

Referring to the drawing, a combustion portion of a power plant system in accordance with the present invention is schematically illustrated. The illustrated system combines a gas cycle with a steam cycle with gas and steam produced by a common pressurized circulating fluidized bed combustor or power plant. The power plant is designed to operate on coal or the like, for producing a high pressure gas to power a gas turbine and producing steam for powering a steam turbine.

The system as illustrated comprises a pressurized vessel 10 within which is located a circulating fluidized bed combustor 12 which is fueled by coal from source 14 and provided with limestone or other sorbents from a source 16 which is mixed in mixers 18 and fed by a suitable pump 20 into the pressurized fluidized bed combustor (PCFB) 12. The combustor serves as a common combustor for producing hot pressurized gases which are used to power a gas turbine 22 and also produces steam which is used to power a steam turbine 24. The gas turbine 22 drives a generator 26 for producing electrical power and drives a compressor 28 for supplying pressurized air to the PCFB by way of supply line 30. Pressurized air from the compressor is fed into the pressure vessel surrounding the combustor. A portion of the air is fed to the bottom of the combustor as combustion air and to fluidize the bed. Another portion of the air circulates around the combustor and enters the combustion chamber above the fuel inlet. The air may be pressurized to a range of 150 to 250 psi and flow in the combustor at velocities of around 15 feet per second. The steam turbine 24 powers an electrical generator 32 for also producing electrical power. The illustrated power plant has a combined cycle power plant meaning it combines the steam cycle and the gas cycle systems for producing power.

It will be appreciated from the illustrated embodiment that the pressurized circulating fluid bed combustor 12 is external to the gas turbine and remote therefrom. In plants of this type, the PCFB combustor is primarily fired to meet the demands of the steam turbine, and not the demands of the gas turbine.

The walls of the combustor 12 are lined with water tubes or lines 34 for circulating water from the steam drum 58. Steam generated in the steam drum 58 flows by way of lines 36 for producing superheated steam supplied by line 38 which serves to power the steam turbine 24. A mixture of coal and limestone or other sorbents fed into the combustor is maintained in a fluidized state by compressed air fed thereto from the compressor 28 and as the fuel is burned, heated gas and ash produced are circulated first through a cyclone separator 40 for circulating and returning larger particles of unburned fuel and limestone by way of return loop 42 to the bottom of the combustion chamber. The separated fluid gases pass by way of a flue 44 to a suitable filter 46 such as a ceramic filter. The ceramic filter removes fine particles from the hot flue gasses and passes the hot gasses by way of hot gas line 48 to the inlet 50 of the gas turbine.

The hot exhaust gases from the turbine 22 pass to a heat recovery economizer 52 to heat feedwater. The exhaust gasses are then directed to an exhaust stack 54 and to the atmosphere.

Steam produced in the combustor is supplied by a main streamline 38 to power the steam turbine 24. Exhaust from this steam turbine passes to a condenser 56 and then through the heat recovery economizer 52 back to a drum 58. Water is circulated through the pipes in the combustor to be heated for producing steam. The steam produced is circulated through one or more super heaters for super heating the main supply of steam supplied to the steam turbine.

The power plant is designed for maximum efficiency at very high loads wherein demand on both the gas and steam turbine is fairly high. However, load demands on power plants typically vary considerably over a 24 hour period and for that reason a plant cannot always operate at or near maximum output and efficiency. As load demand drops, the power output of the combustor is also reduced to compensate for the reduced demand. This results in a gas flow and temperature dropping as demand drops and eventually to the point where it may be insufficient to power the turbine to power the compressor. As an alternative to firing the turbine on auxiliary fuel, or motoring the generator, some other means must be provided for maintaining power to the turbine for operation of the compressor.

In accordance with the present invention, injector means are provided for injecting steam to supplement gas to maintain synchronous speed at low load operation of the gas turbine. The injection means includes a steam supply line 64 controlled by a valve 66 which is controlled by suitable control means 68 for injecting steam into the inlet 50 of the gas turbine 22. The steam source is preferably super heated dry steam such as from the main steam line 38. This injection of steam increases the mass flow to the turbine and maintains low load operating capability to keep the compressor in operation.

The control means 68 is provided with appropriate monitoring means for monitoring the load of the system so that in case of low load, the valve 66 is operated to maintain the turbine 22 in operation. The load on the system will be reflected in the temperature of the flue gasses in line 48. Suitable means such as a temperature sensing means 70 may be provided for sensing the temperature of the flue gas in line 48 and activating the control means 68 in response to a drop below certain levels. Other sensing means such as mass flow and/or pressure of the gas in line 48 may also be used to determine the need for steam injection. (Or monitoring GT generator output).

While we have illustrated and described our invention by means of specific embodiments, it is to be understood that numerous changes and modifications may be made therein without departing from the spirit and scope of the invention as defined in the appended claims.

We claim:

1. A combined cycle pressurized fluidized bed power plant having a system for maintaining operation during low load condition, comprising:

pressurized fluidized bed combustor means for burning fuel for producing a gas for powering a gas turbine during normal operating conditions, and including steam generating means for producing steam for powering a steam turbine;

a gas turbine responsive to said gas for powering a compressor for pressurizing said fluidized bed combustor means and for supplying air to said combustor means, and said turbine connected to a first generator for generating electrical power;

a steam turbine responsive to said steam for powering a second generator for generating electrical power; and means for directing steam from said steam generating means into said gas turbine for powering said gas turbine during low load conditions of the power plant when said gas is insufficient.

2. A power plant according to claim 1 wherein said combustor means is coal fired and is remote from the gas turbine.

3. A power plant according to claim 2 wherein the power plant includes a filter and gas produced by said combustor is filtered and directed for normally powering said gas turbine.

4. A power plant according to claim 3 wherein said means for directing steam into said gas turbine comprises a source of dry steam and means responsive to a drop in flue gas temperature below a predetermined level for directing steam from said source to the gas turbine inlet.

5. A power plant according to claim 1 wherein the power plant includes a filter and combustion gas produced by said combustor is filtered and directed for normally powering said gas turbine.

6. A power plant according to claim 5 wherein said means for injecting steam into said gas turbine comprises a source of dry steam and means responsive to flue gas temperature for directing steam from said source to the gas turbine inlet.

7. A power plant according to claim 1 wherein said means for injecting steam into said gas turbine comprises a source of dry steam and means responsive to a drop in flue gas temperature below a predetermined level for directing steam from said source to the gas turbine inlet.

8. A power plant according to claim 7 wherein said combustor means is coal fired and is remote from the gas turbine.

9. A power plant according to claim 1 wherein said pressurized fluidized bed combustor means comprises a circulating fluidized bed combustor confined within a pressurized vessel, 10. A pressurized fluidized bed combined gas cycle and steam cycle power plant having means for maintaining compressor operation during low load condition, comprising:

a pressurized fluidized bed combustor for burning fuel for producing a high pressure gas for powering a gas turbine during normal operation;

steam generating means associated with said combustor for producing steam for powering a steam turbine;

a gas turbine powered by said high pressure gas for powering a compressor for pressurizing said combustor and for supplying fluidizing and combustion air to said combustor and said gas turbine operatively connected for powering a generator for generating electrical power;

a steam turbine powered by said steam for powering a generator for generating electrical power; and means for directing steam from said steam generating means into and powering said gas turbine for powering the compressor during low load conditions of the power plant when said high pressure gas is insufficient.

11. A power plant according to claim 10 wherein said combustor means is coal fired and is remote from the gas turbine.

12. A power plant according to claim 11 wherein said power plant includes a filter and said high pressure gas produced by said combustor is filtered and directed for powering said gas turbine.

13. A power plant according to claim 12 wherein said means for directing steam into said gas turbine comprises a source of dry steam and means responsive to a drop in flue gas temperature to a predetermined level for directing steam from said source to the gas turbine inlet.

14. A power plant according to claim 10 wherein said pressurized fluidized bed combustor comprises a circulating fluidized bed combustor mounted within a pressurized vessel.

15. A method of establishing and operating a combined gas cycle and steam cycle pressurized fluidized bed power plant for the efficient conversion of a coal to energy, for maintaining compressor operation during low load condition, comprising the steps of:

providing a pressurized circulating fluidized bed combustor for burning fuel for producing a high pressure gas for powering a gas turbine;

providing steam generating means associated with said combustor for producing steam for powering a steam turbine;

providing a gas turbine and powering said turbine by said high pressure gas for powering a compressor for pressurizing said power plant and supplying fluidizing and combustion air to the combustor and, said gas turbine connected to a generator for generating electrical power;

providing a steam turbine powered by said steam for powering a generator for generating electrical power; and directing steam from said steam generating means into and powering said gas turbine for powering the compressor during low load conditions of the power plant when said high pressure gas is insufficient.

16. A method according to claim 15 wherein the step of powering said gas turbine with said combustor includes providing said combustor to be coal fired and remote from the gas turbine.

17. A method according to claim 16 wherein the step of directing steam into said gas turbine comprises providing a source of dry steam, and providing means responsive to a drop in flue gas temperature below a predetermined level for directing steam from said source to the gas turbine inlet.

18. A method according to claim 15 wherein the step of providing said pressurized fluidized bed combustor comprises providing a circulating fluidized bed combustor mounted within a pressurized vessel.

* * * * *